(12) United States Patent
Liu et al.

(10) Patent No.: US 6,747,797 B2
(45) Date of Patent: Jun. 8, 2004

(54) LOOP OPTICAL CIRCULATOR (75) Inventors: Zhimin Liu, San Jose, CA (US); Mark S. Wang, San Jose, CA (US); Jingyu Xu, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/899,481

(22) Filed: Jul. 5, 2001

(65) Prior Publication Data

US 2003/0007244 A1 Jan. 9, 2003

(51) Int. Cl.$^7$ ............................................. G02B 27/28
(52) U.S. Cl. ................... 359/484; 359/494; 359/495; 359/497
(58) Field of Search ................. 359/494, 495, 359/496, 497, 484, 122; 385/11, 36

(56) References Cited

U.S. PATENT DOCUMENTS

| 5,034,950 A | * | 7/1991 | Jackel et al. ............. 372/106 |
| 5,878,176 A | * | 3/1999 | Cheng ......................... 359/484 |
| 6,002,512 A | * | 12/1999 | Bergmann et al. .......... 359/256 |
| 6,226,115 B1 | * | 5/2001 | Shirasaki et al. ............ 359/280 |
| 6,236,506 B1 | * | 5/2001 | Cao .............................. 359/484 |
| 6,282,336 B1 | * | 8/2001 | Riza ............................. 385/21 |
| 2002/0024730 A1 | * | 2/2002 | Ducellier et al. ............ 359/498 |

FOREIGN PATENT DOCUMENTS

| AU | WO 94/09400 | * | 4/1994 | .............. G02F/1/09 |
| EP | 1103838 A2 | * | 5/2001 | .............. G02F/1/09 |

* cited by examiner

Primary Examiner—Mark A. Robinson
Assistant Examiner—Lee Fineman
(74) Attorney, Agent, or Firm—Fish & Richardson P.C.

(57) ABSTRACT

A four-port loop optical circulator includes a first, a second, a third and a fourth optical ports for receiving optical beam therein. The circulator further includes a plurality of optical components. The optical components include a walk-off crystal for generating a vertical optical path displacement for a vertical polarized optical beam and for passing a horizontally polarized optical beam therethrough maintaining a same optical path. The optical components also include a vertical displacement device for shifting an optical path along a vertical direction with a predefined vertical displacement for an optical beam transmitted with a particular polarization. The vertical displacement device is coupled to the walk-off crystal for guiding a beam received from the fourth port to project from the first port.

21 Claims, 4 Drawing Sheets

LOOP OPTICAL CIRCULATOR

FIELD OF THE INVENTION

The present invention relates generally to an optical circulator for fiber optic communication systems. More particularly, this invention relates to a loop optical circulator.

BACKGROUND OF THE INVENTION

An optical circulator is a device employed to transfer a light beam in a sequential order from one port to another. A circulator has at least three optical ports. These ports can be accessed in such order that when a light beam is caused to enter into an optical port, this light-beam after passing through the circulator to exit from a next optical port. For example, a first optical beam enters the circulator through the first port of an optical circulator exits from the second port; an optical beam enters the circulator from a second port exits from the third port. An optical circulator is an important passive device that has a non-reciprocal function. As the conventional circulators available in the marketplace are mostly non-circular in nature, there is a need in the art to provide a close loop circulator for more flexible applications, particularly in bi-directional optical signal transmissions as will be further described below.

Therefore, a need still exists in the art of manufacturing and designing the fiber optic circulator to provide improved close-loop circulator configuration. Specifically, novel and improved circulator configurations enable a circulator having four optical ports that is capable to function as a close loop optical circulator for bi-directional optical signal transmission is highly desirable.

SUMMARY OF THE PRESENT INVENTION

It is therefore an object of the present invention to provide an improved design and configuration for manufacturing a fiber optic circulator to achieve loop signal transmission and has compact volume and low production cost such that the aforementioned difficulties and limitations in the prior art can be overcome.

Specifically, it is an object of the present invention to provide a circulator implemented with improved configuration by employing polarization-dependent vertical-displacement means for vertically shifting the optical paths for particularly polarized beams to achieve a close-loop circulator. The flexibility and capacities of optical signal transmissions are improved with close-loop circulator available for more complete bi-directional signal transmissions.

Another object of the present invention is to provide a circulator with improved configuration by taking advantage of the non-reciprocal characteristic of Faraday rotator coupled with the polarization-dependent beam-displacement function of a walk-off crystal and polarization beam splitter. Symmetrically transmissions of forward and backward projected beams from different ports are therefore achieved.

Briefly, in a preferred embodiment, the present invention includes an optical circulator. The optical circulator includes a four-port optical circulator. The circulator includes a first, a second, a third and a fourth optical ports for receiving optical beam therein. The circulator further includes a plurality of optical components for guiding a beam received from the first port to project from the second port, for guiding a beam received from the second port to project from the third port. The optical components are used for guiding a beam received from the third port to project from the fourth port, and for guiding a beam received from the fourth port to project from the first port. In a preferred embodiment, the plurality of optical components further include a walk-off crystal for generating a vertical optical path displacement for a vertical polarized optical beam and for passing a horizontally polarized optical beam therethrough maintaining a same optical path.

These and other objects and advantages of the present invention will no doubt become obvious to those of ordinary skill in the art after having read the following detailed description of the preferred embodiment which is illustrated in the various drawing figures.

DETAILED DESCRIPTION OF THE INVENTION

Figure 1:
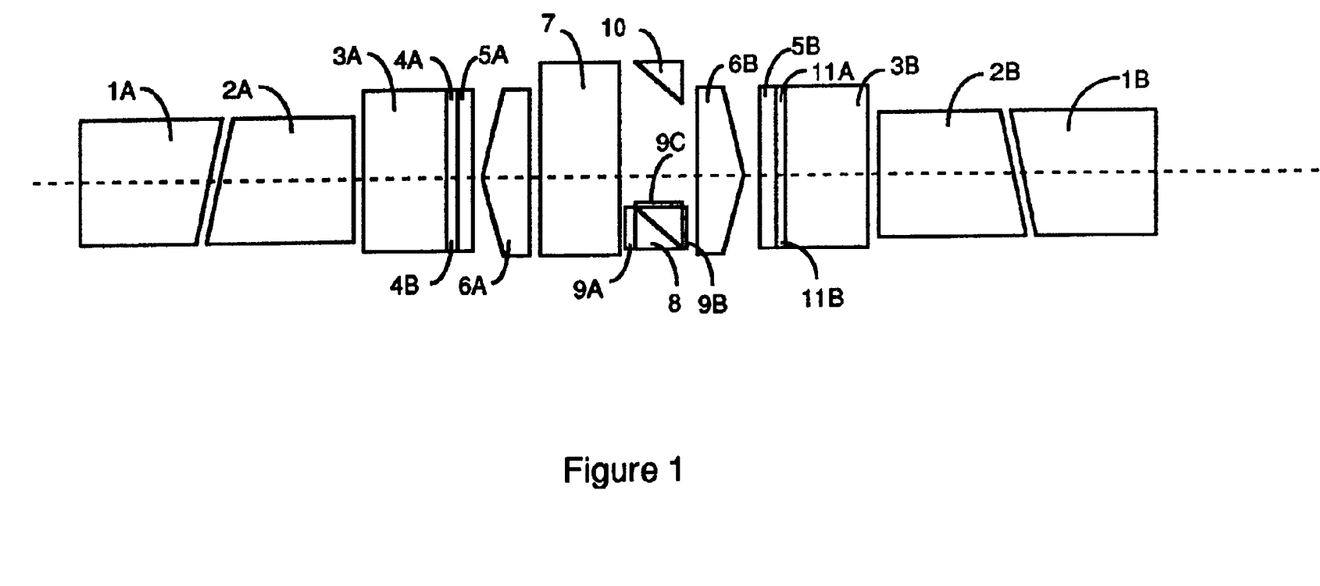
FIG. 1 is a side cross sectional view of a four-port loop-circulator of this invention.
Figure 2A:
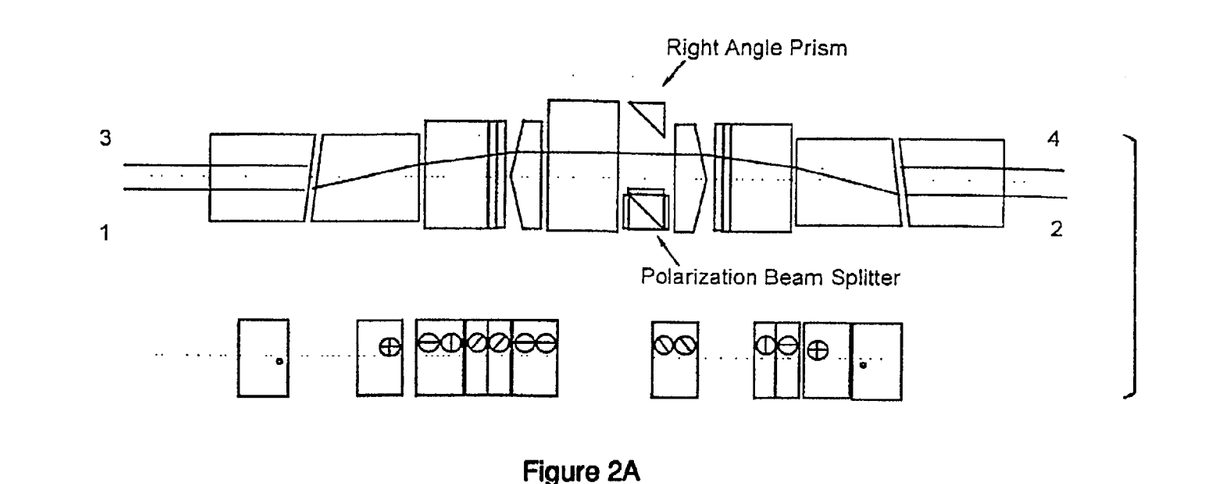
FIGS. 2A and 2B show the sequences of polarization states and relative position of the beam components for a forward projecting and backward projecting beams respectively for transmitting a light from port 1 to port 2 and port 2 to port 3 respectively.

Referring to FIG. 1 for a side cross sectional view of a four port loop optical circulator of this invention. As shown in FIG. 1, port 1 and port 3 are provided at the left end of the circulator and ports 2 and 4 are provided at the right end of the circulator. Referring to FIG. 2A for the optical paths and state of polarizations (SOP) of a light that incident into port 1 is outputted from port 2. And referring to FIG. 2B for the optical paths and state of polarizations (SOP) of a light that incident into port 2 is outputted from port 3. The state of polarizations (SOP) of a beam is represented by the short-bars in small circles. As the incident light, received from port 1, pass through a collimator comprises a dual fiber capillary 1A, and a GRIN lens 2A, a collimated beam is generated. The collimated beam is projected to a birefringent crystal 3A; the beam is divided into two mutually orthogonal components, namely ordinary and extraordinary components. These two components are spatially separated to pass through half wave plates 4A and 4B respectively. The half wave plates 4A and 4B are applied to rotate the state of polarization of the beam to mirror position against the optical axis of the plates. The arrangement of the optical axis of the two half wave plates 4A and 4B causes the state of polarization of the o-component and the e-component to have a forty-five degree tilt toward the first quadrant as that shown in FIG. 2A. A Faraday rotator 5A rotates these two beam components to have same state of polarization represented by two horizontal bars in the small circles. The Faraday rotator 5A serves a function to rotate the state of polarization for optical beams passing through regardless of the beam transmission directions. A walk off crystal 7 is employed that serves a special function to maintain the incident optical path without optical-path displacement for beams with a horizontal polarization represented by the horizontal bars. The walk off crystal 7 on the other hand causes an angular walk-off projection from the original incident optical path for vertical state of polarization as will be further discussed below.

Referring to FIG. 2A, as the collimated beam projected from a dual fiber collimator with a small angular tilt, a first prism 6A is implemented to generate beam components complete parallel to the central axis of the walk-off crystal. After passing through the walk-off crystal 7, the beam components, as shown in FIG. 2A, are projected through a prism 6B to generate a small tilt angle and ready to project to an output port of a dual fiber collimator. The state of polarization of these two beam components when passing through the Faraday rotator 5B are rotated to a negative forty-five degree tilted toward the second quadrant. The o-component beam and the e-component beam are transmitted through two half-wave plates 11A and 11B. The states of polarization for these two beam components after passing through the half-wave plates are mutually orthogonal as shown in FIG. 2A. These two beam components are recombined through the second birefringent crystal 3B as an output beam for projecting to output port 2 with a small tilt angle to match the small tilt angle of the optical fiber of port two incorporated in a dual fiber collimator.

Figure 2B:
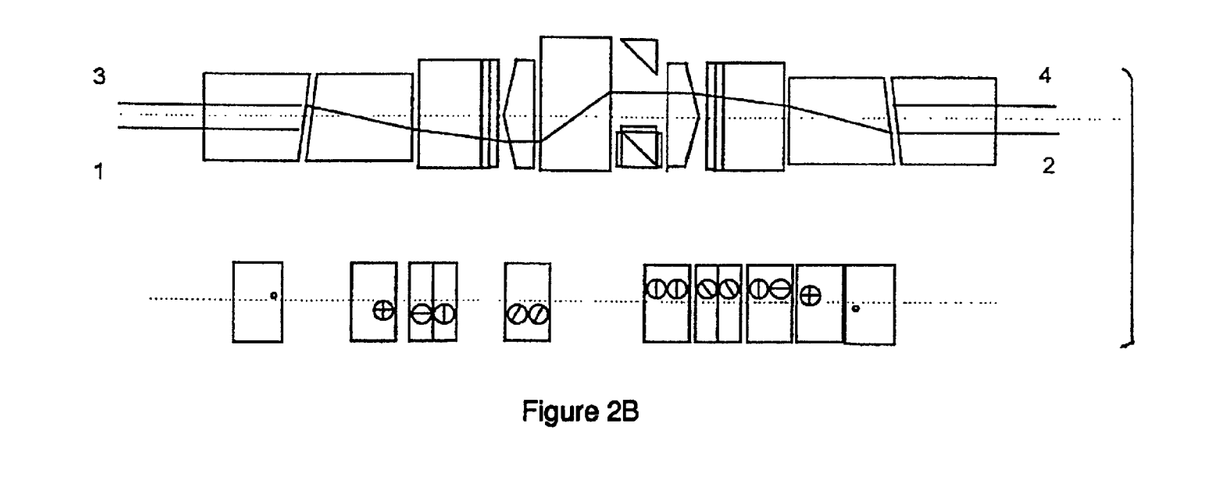

Referring to FIG. 2B for the optical path and state of polarization for an incident beam entering into port 2 for projecting out from port 3. Since the optical components discussed for FIGS. 1 and 2A are arranged in a mirror symmetrical fashion relative to the walk-off crystal 7, the optical path and state of polarization descriptions are similar to that provided for FIG. 2A above. As the incident light, received from port 2, pass through a collimator comprises a dual fiber capillary 1B, and a GRIN lens 2B, a collimated beam is generated. The collimated beam is projected to a birefringent crystal 3B; the beam is divided into two mutually orthogonal components, namely ordinary and extraordinary components. These two components are spatially separated to pass through two half-wave plates 11A and 11B. The half wave plates 11A and 11B are applied to rotate the state of polarization of the beam to mirror position against the optical axis of the plates. The arrangement of the optical axis of the two half wave plates 11A and 11B causes the state of polarization of the o-component and the e-component to have a forty-five degree tilt toward the second quadrant as that shown in FIG. 2B. A Faraday rotator 5B rotates these two beam components to have same state of polarization represented by two vertical bars in the small circles. The second prism generated parallel beam components for the walk-off crystal 7. The walk off crystal 7 causes an angular walk-off projection from the original incident optical path for vertical state of polarization. After passing through the walk-off crystal 7, the beam components, as shown in FIG. 2B, are projected through a prism 6A to generate a small tilt angle and ready to project to an output port of a dual fiber collimator. The state of polarization of these two beam components when passing through the Faraday rotator 5A are rotated to a positive forty-five degree tilted toward the first quadrant. These states of polarization of these two beam components after passing through the half-wave plates 4A and 4B are rotated to be mutually orthogonal again. These two beam components are recombined through the second birefringent crystal 3B as an output beam for projecting to output port 3 with a small tilt angle to match the small tilt angle of the optical fiber of port two incorporated in a dual fiber collimator.

Figure 3A:
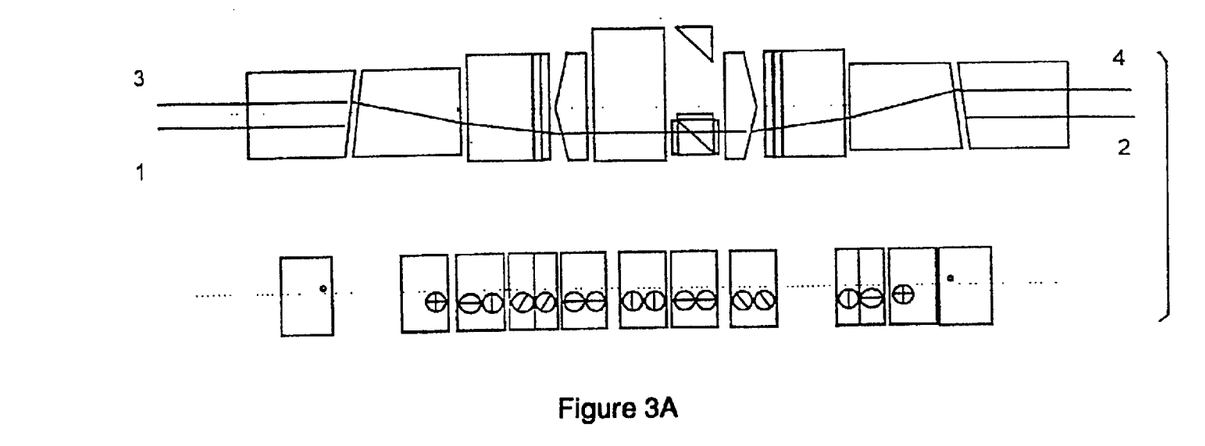
FIGS. 3A and 3B show the sequences of polarization states and relative position of the beam components for a forward projecting and backward projecting beams respectively for transmitting a light from port 3 to port 4 and port 4 to port 1 respectively.

Referring to FIG. 3A for the optical paths and state of polarizations (SOP) of a light that incident into port 3 is outputted from port 4. And referring to FIG. 3B for the optical paths of a light that incident into port 4 is outputted from port 1. The changes of the states of polarization of the light entering into port 3 are the same as the light entering into port 1 except that the optical path is now transmitted through the lower portion of the first set of optical components. Similarly, the changes of the states of polarization of the light entering into port 4 are the same as the light entering into port 2 except that the optical path is now transmitted through the lower portion of the first set of optical component.

As the incident light, received from port 3, passes through a collimator comprises a dual fiber capillary 1A, and a GRIN lens 2A, a collimated beam is generated. The collimated beam is projected to a birefringent crystal 3A; the beam is divided into two mutually orthogonal components, namely ordinary and extraordinary components. These two components are spatially separated to pass through half wave plates 4A and 4B respectively. The half wave plates 4A and 4B are applied to rotate the state of polarization of the beam to mirror position against the optical axis of the plates. The arrangement of the optical axis of the two half wave plates 4A and 4B causes the state of polarization of the o-component and the e-component to have a forty-five degree tilt toward the first quadrant as that shown in FIG. 2A. A Faraday rotator 5A rotates these two beam components to have same state of polarization represented by two horizontal bars in the small circles. The prism 6A corrects the tilt angle of the dual fiber collimator to generate beams components parallel to the walk off crystal. The walk off crystal 7 is employed that serves a special function to maintain the incident optical path without optical-path displacement for beams with a horizontal polarization represented by the horizontal bars. After passing through the walk-off crystal 7, the beam components, as shown in FIG. 3A, are projected through a polarization beam splitter (PBS) 8 maintaining a same optical path. The PBS transmits light with SOP in incident plane to pass through and reflects the light with SOP perpendicular to the plane. The SOP of the light in the optical path of 3 to 4 marked by horizontal bar is perpendicular to the incident plane. In order to transmit the light passing through the PBS, the half wave plate (HWP) 9A which axis is 45-degree orientation is used to rotate the SOP with 90-degree rotation to allow the light to pass through. After the PBS, the HWP 9B changes the SOP back to the original SOP. Then the beam components are projected to a prism 6B to generate a small tilt angle and ready to project to an output port of a dual fiber collimator. The state of polarization of these two beam components when passing through the Faraday rotator 5B are rotated to a negative forty-five degree tilted toward the second quadrant. These states of polarization of these two beam components after passing through the half-wave plates 11A and 11B are rotated to be mutually orthogonal again. These two beam components are recombined through the second birefringent crystal 3B as an output beam for projecting to output port 4 with a small tilt angle to match the small tilt angle of the optical fiber of port two incorporated m a dual fiber collimator.

The optical paths and state of polarization variations for the light entering into port 4 to project out from port 1 are basically identical to the descriptions for FIG. 2B. The only exception is the use of the polarization beam splitter 8 and a right angle prism 9. The use of these two optical components are to shift the optical path from the lower portion in the first set of optical components to an upper portion for transmitting to the walk-off crystal 7.

Figure 3B:
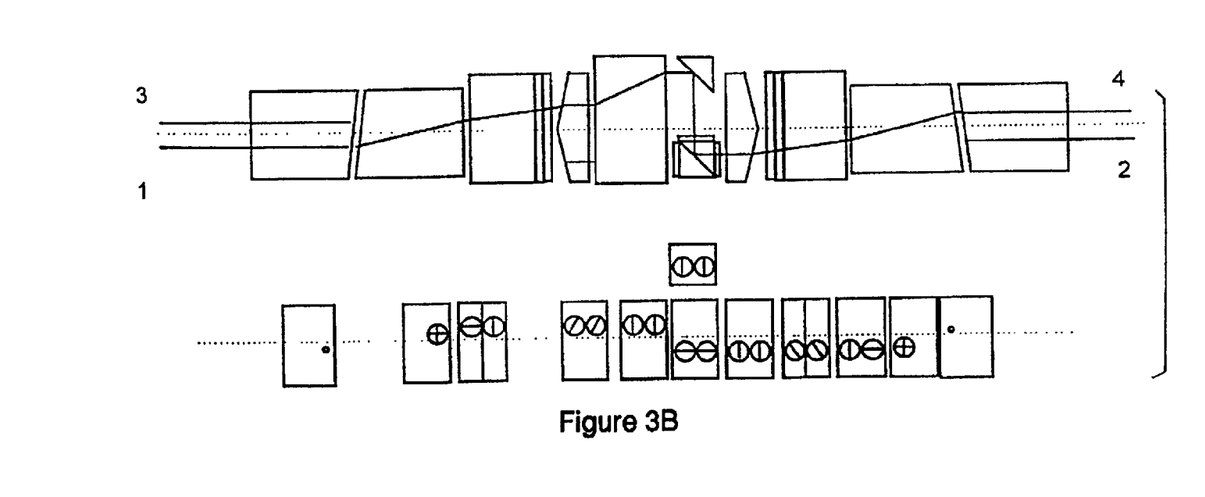

Referring to FIG. 3B for the optical path and state of polarization for an incident beam entering into port 4 for projecting out from port 1. As the incident light, received from port 4, pass through a collimator comprises a dual fiber capillary 1B, and a GRIN lens 2B, a collimated beam is generated. The collimated beam is projected to a birefringent crystal 3B; the beam is divided into two mutually orthogonal components, namely ordinary and extraordinary components. These two components are spatially separated to pass through half wave plates 11A and 11B. The half wave plates 11A and 11B are applied to rotate the state of polarization of the beam to mirror position against the optical axis of the plates. The arrangement of the optical axis of the two half wave plates 4B causes the state of polarization of the o-component and the e-component to have a forty-five degree tilt toward the second quadrant as that shown in FIG. 3B. A Faraday rotator 5B rotates these two beam components to have same state of polarization represented by two vertical bars in the small circles. The second prism 6B generated parallel beam components for the walk-off crystal 7. The HWP 9B changes SOP of light from vertical to horizontal to allow light to be reflected by the PBS, after the reflection, the HWP 9C changes the SOP back. The PBS 8 and a right angle prism 10 are implemented to vertically shift the beams to an upper portion of the walk-off crystal 7.

The walk off crystal 7 causes an angular walk-off projection from the original incident optical path for vertical state of polarization. After passing through the walk-off crystal 7, the beam components, as shown in FIG. 3B, are projected through a prism 6A to generate a small tilt angle and ready to project to an output port of a dual fiber collimator. The states of polarization of these two beam components when passing through the Faraday rotator 5A are rotated to a positive forty-five degree tilted toward the first quadrant. These states of polarization of these two beam components after passing through the half-wave plates 4A and 4B are rotated to be mutually orthogonal again. These two beam components are recombined through the birefringent crystal 3A as an output beam for projecting to output port 1 with a small tilt angle to match the small tilt angle of the optical fiber of port two incorporated in a dual fiber collimator.

According to FIGS. 1 to 3 and above descriptions, this invention discloses a four-port loop optical circulator. The four-port circulator includes a first, a second, a third and a fourth optical ports for receiving optical beam therein. The four-port circulator further includes a plurality of optical components for guiding a beam received from the first port to project from the second port, for guiding a beam received from the second port to project from the third port, for guiding a beam received from the third port to project from the fourth port, and for guiding a beam received from the fourth port to project from the first port. In a preferred embodiment, the plurality of optical components further includes a walk-off crystal for generating a vertical optical path displacement for a vertical polarized optical beam and for passing a horizontally polarized optical beam therethrough maintaining a same optical path. In another preferred embodiment, the plurality of optical components further includes a first birefringent crystal disposed on a left hand-side of the walk-off crystal for generating a first ordinary beam and a first extra-ordinary beam and a second birefringent crystal disposed on a right-hand side of the walk-off crystal for generating a second ordinary beam and a second extra-ordinary beam. In another preferred embodiment, the plurality of optical components further includes a first polarization rotation means disposed on the left hand-side of the walk-off crystal for generating a first state of polarization (SOP) for the first ordinary beam and the first extra-ordinary beam to project to the walk-off crystal and a second polarization rotation means disposed on the right-hand side of the walk-off crystal for generating a second SOP for the second ordinary beam and the second extra-ordinary beam to project to the walk-off crystal wherein the first SOP is orthogonal to the second SOP. In another preferred embodiment, the plurality of optical components further includes a vertical displacement means for shifting an optical path along a vertical direction with a predefined vertical displacement for an optical beam transmitted with a particular polarization. In another preferred embodiment, the vertical displacement means further comprising a polarized beam splitter for reflecting an optical beam with the particular polarization substantially along a vertical direction for generating the predefined vertical displacement. In another preferred embodiment, the vertical displacement means further comprising a right angle prism disposed at the predefined vertical displacement away from the polarized beam splitter, the right angle prism reflecting the optical beam with the particular polarization projected from the polarized beam splitter for transmitting the optical beam with the particular polarization substantially along a horizontal direction. In another preferred embodiment, the vertical displacement means further comprising a first set of half wave plates for changing a state of polarization (SOP) of a beam by 90 degrees toward a first angular direction to a PBS-incident SOP to allow a beam to pass through or reflected from the PBS depending on the PBS-incident SOP then another set of half wave plates to rotate the SOP of the beam by 90 degrees toward a second angular direction opposite to the first angular direction.

Figure 4A:
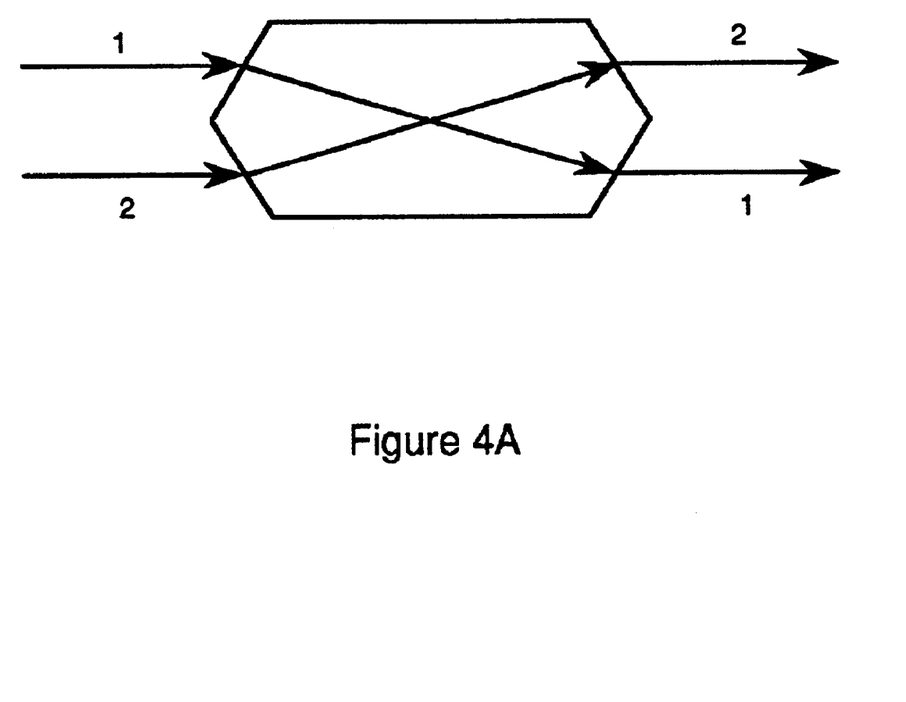
FIGS. 4A and 4B show the function of rhomb prism and DOVE prism that exchange positions of a pair of light beam.
Figure 4B:
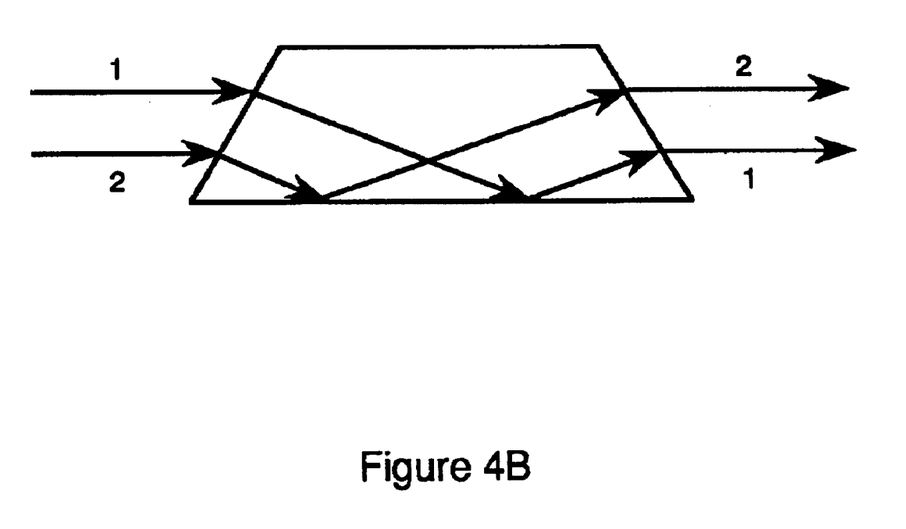

If the Faraday rotator is latched and outside magnetic field is applied, the circulator can switch the route of signal transmissions from a port sequence of 1-2-3-4-1 to 4-3-2-1-4. Latched Faraday rotator is bi-stable element corresponding to directions of magnetic field. If the rotator works as described above prefer embodiment, the route is 1-2-3-4-1, if the magnetic field becomes opposite direction (since the rotator is latched, only a pulse is required), the Faraday rotator rotates SOP in opposite direction, the route becomes 4-3-2-1-4. This function can be realized by placing additional electrically controlled half wave plate such as TN liquid crystal, or LC wave plate, or Electro-optic plate before or behind each Faraday rotator in the standard loop circulator. The electrically controlled half wave plate changes SOP by 90 degrees so that the optical path will change according to rotated SOP to generate new route. Additionally, by introducing in mechanically controlled rhomb prism or DOVE prism into optical path, the route could be switched to be 3-2-1-4-3, 1-4-3-2-1, or 3-4-1-2-3. The rhomb prism or DOVE prism exchanges positions of light beam as shown in FIG. 4, so that changes the route in circulators.

According to FIGS. 1 to 4 and above descriptions, this invention further discloses a switchable optical loop circulator. The circulator includes a loop optical circulator and at least an optical switching means disposed in an optical path of the loop circulator for switching optical transmission paths of the loop optical circulator. In a preferred embodiment, the switching means comprising a set of latched Faraday rotators surrounded by an electromagnetic pulse means for controlling a rotation direction of the latched Faraday rotators. In another preferred embodiment, the switching means further comprising electrically controlled half wave plates composed of electro-optic materials. In another preferred embodiment, the switching means further comprising an electrically controlled half wave plate composed of liquid crystals. In another preferred embodiment, the switching means further comprising an electrically controlled in/out rhomb prism. In yet another preferred embodiment, the switching means further comprising an electrically controlled in/out DOVE prism Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A four-port loop optical circulator comprising:
   a first, a second, a third and a fourth optical port for receiving an optical beam therein;
   a plurality of optical components for guiding a beam received from said first port to project from said second port, for guiding a beam received from said second port to project from said third port, for guiding a beam received from said third port to project from said fourth port, and for guiding a beam received from said fourth port to project from said first port; and wherein said plurality of optical components includes
      a walk-off crystal for generating a vertical optical path displacement for a vertical polarized optical beam and for passing a horizontally polarized optical beam therethrough maintaining a same optical path,
      a vertical displacement means for shifting an optical path along a vertical direction with a predefined vertical displacement for an optical beam transmitted with a particular polarization, and
      wherein said vertical displacement means is coupled to said walk-off crystal for guiding a beam received from said fourth port to project from said first port, and
   said plurality of optical components further includes a first birefringent crystal disposed on a left-hand side of said walk-off crystal for generating a first ordinary beam and a first extra-ordinary beam and a second birefringent crystal disposed on a right-hand side of said walk-off crystal for generating a second ordinary beam and a second extra-ordinary beam.

2. The four-port loop optical circulator of claim 1 wherein:
   said plurality of optical components further includes a first polarization rotation means disposed on said left-hand side of said walk-off crystal for generating a first state of polarization (SOP) for said first ordinary beam and said first extra-ordinary beam to project to said walk-off crystal and a second polarization rotation means disposed on said right-hand side of said walk-off crystal for generating a second SOP for said second ordinary beam and said second extra-ordinary beam to project to said walk-off crystal wherein said first SOP is orthogonal to said second SOP.

3. The four-port loop optical circulator of claim 1 wherein:
   said vertical displacement means further comprising a polarized beam splitter for reflecting an optical beam with said particular polarization substantially along a vertical direction for generating said predefined vertical displacement.

4. The four-port loop optical circulator of claim 3 wherein:
   said vertical displacement means further comprising a right angle prism disposed at said predefined vertical displacement away from said polarized beam splitter, said right angle prism reflecting said optical beam with said particular polarization projected from said polarized beam splitter for transmitting said optical beam with said particular polarization substantially along a horizontal direction.

5. The four-port loop optical circulator of claim 4 wherein:
   said vertical displacement means further comprising a first set of half wave plates for changing a state of polarization (SOP) of a beam by 90 degrees toward a first angular direction to a polarized beam splitter (PBS)-incident SOP to allow a beam to pass through or reflected from said PBS depending on said PBS-incident SOP then another set of half wave plates to rotate said SOP of said beam by 90 degrees toward a second angular direction opposite to said first angular direction.

6. The four-port optical loop circulator of claim 1, further comprising:
   an optical switching means disposed in an optical path of the loop circulator to switch an order of circulation of said loop optical circulator.

7. The switching means of claim 6 wherein:
   said switching means comprising a set of latched Faraday rotators surrounded by an electromagnetic pulse means for controlling a rotation direction of said latched Faraday rotators.

8. The switching means of claim 6 wherein:
   said switching means further comprising electrically controlled half wave plates composed of electro-optic materials.

9. The switching means of claim 6 wherein:
   said switching means further comprising an electrically controlled half wave plate composed of liquid crystals.

10. The switching means of claim 6 wherein:
    said switching means further comprising an electrically controlled in/out rhomb prism.

11. The switching means of claim 6 wherein:
    said switching means further comprising an electrically controlled in/out DOVE prism.

12. A four-port loop optical circulator comprising:
    a first, a second, a third and a fourth optical ports for receiving optical beam therein;
    a plurality of optical components for guiding a beam received from said first port to project from said second port, for guiding a beam received from said second port to project from said third port, for guiding a beam received from said third port to project from said fourth port, and for guiding a beam received from said fourth port to project from said first port; and wherein said plurality of optical components includes
       a walk-off crystal for generating a vertical optical path displacement for a vertical polarized optical beam and for passing a horizontally polarized optical beam therethrough maintaining a same optical path,
       a vertical displacement means for shifting an optical path along a vertical direction with a predefined vertical displacement for an optical beam transmitted with a particular polarization, and
       wherein said vertical displacement means is adapted to transmit or receive said vertical polarized optical beam from said walk-off crystal, including vertically displacing the beam received from said fourth port and not vertically displacing the beam received from said second port or first port.

13. The four-port loop optical circulator of claim 12 wherein:
said plurality of optical components further includes a first birefringent crystal disposed on a left-hand side of said walk-off crystal for generating a first ordinary beam and a first extra-ordinary beam and a second birefringent crystal disposed on a right-hand side of said walk-off crystal for generating a second ordinary beam and a second extra-ordinary beam.

14. The four-port loop optical circulator of claim 12 wherein:
said plurality of optical components further includes a first polarization rotation means disposed on said left-hand side of said walk-off crystal for generating a first state of polarization (SOP) for said first ordinary beam and said first extra-ordinary beam to project to said walk-off crystal and a second polarization rotation means disposed on said right-hand side of said walk-off crystal for generating a second SOP for said second ordinary beam and said second extra-ordinary beam to project to said walk-off crystal wherein said first SOP is orthogonal to said second SOP.

15. The four-port loop optical circulator of claim 12 wherein:
said vertical displacement means further comprising a polarized beam splitter for reflecting an optical beam with said particular polarization substantially along a vertical direction for generating said predefined vertical displacement.

16. The four-port loop optical circulator of claim 15 wherein:
said vertical displacement means further comprising a right angle prism disposed at said predefined vertical displacement away from said polarized beam splitter, said right angle prism reflecting said optical beam with said particular polarization projected from said polarized beam splitter for transmitting said optical beam with said particular polarization substantially along a horizontal direction.

17. The four-port loop optical circulator of claim 16 wherein:
said vertical displacement means further comprising a first set of half wave plates for changing a state of polarization (SOP) of a beam by 90 degrees toward a first angular direction to a PBS-incident SOP to allow a beam to pass through or reflected from said PBS depending on said PBS-incident SOP then another set of half wave plates to rotate said SOP of said beam by 90 degrees toward a second angular direction opposite to said first angular direction.

18. The four-port optical loop circulator of claim 12, further comprising:
an optical switching means disposed in an optical path of the loop circulator to switch order of circulation of said loop optical circulator.

19. A four-port optical loop circulator comprising:
a first, a second, a third and a fourth optical ports for receiving an optical beam therein;
a plurality of optical components for guiding a beam received from said first port to project from said second port, for guiding a beam received from said second port to project from said third port, for guiding a beam received from said third port to project from said fourth port, and for guiding a beam received from said fourth port to project from said first port; and wherein said plurality of optical components includes
a walk-off crystal for generating a vertical optical path displacement for a first polarized optical beam and for passing a second polarized optical beam therethrough maintaining the same optical path,
a polarization beam splitter ("PBS") coupled to the walk-off crystal and configured to reflect a beam received at a lower optical path from said fourth port along a vertical direction for generating a predefined vertical displacement, and not to reflect a beam received from any other port; and
a right angle prism disposed at the predefined vertical displacement from the PBS and configured to reflect an optical beam received from the PBS in a substantially horizontal direction along an upper optical path to the walk-off crystal.

20. The four-port optical loop circulator of claim 19 wherein said plurality of optical components further includes
at least one prism configured to deflect light from apart regardless of the light's state of polarization.

21. A four-port optical loop circulator comprising:
a first, a second, a third and a fourth optical ports for receiving an optical beam therein;
a plurality of optical components for guiding a beam received from said first port to project from said second port, for guiding a beam received from said second port to project from said third port, for guiding a beam received from said third port to project from said fourth port, and for guiding a beam received from said fourth port to project from said first port; and wherein said plurality of optical components includes
a walk-off crystal for generating a vertical optical path displacement for a first polarized optical beam and for passing a second polarized optical beam therethrough maintaining the same optical path,
a polarization beam splitter ("PBS") coupled to the walk-off crystal and configured to reflect a beam received at a lower optical path from said fourth port along a vertical direction for generating a predefined vertical displacement without reflecting the beam received from said second port;
a right angle prism disposed at the predefined vertical displacement from the PBS and configured to reflect an optical beam received from the PBS in a substantially horizontal direction along an upper optical path to the walk-off crystal;
a first half wave plate for changing a state of polarization ("SOP") of light from a first SOP to a second SOP to allow light to be reflected by the PBS; and
a second half wave plate for changing the SOP back to the first SOP after reflection by the PBS.

* * * * *

UNITED STATES PATENT AND TRADEMARK OFFICE
CERTIFICATE OF CORRECTION

PATENT NO. : 6,747,797 B2
DATED : June 8, 2004
INVENTOR(S) : Zhimin Liu, Mark S. Wang and Jingyu Xu It is certified that error appears in the above-identified patent and that said Letters Patent is hereby corrected as shown below:

<u>Column 10,</u>
Line 27, please replace, "to deflect light from apart" with -- to deflect light from a port --

Signed and Sealed this

Fifteenth Day of February, 2005

JON W. DUDAS
*Director of the United States Patent and Trademark Office*